United States Patent
Khan (10) Patent No.: US 12,032,513 B2
(45) Date of Patent: Jul. 9, 2024

(54) DATA CONTROL, MANAGEMENT, AND PERPETUAL MONETIZATION CONTROL METHODS AND SYSTEMS

(71) Applicant: Fahad Khan, Princeton, NJ (US)

(72) Inventor: Fahad Khan, Princeton, NJ (US)

( * ) Notice: Subject to any disclaimer, the term of this patent is extended or adjusted under 35 U.S.C. 154(b) by 597 days.

(21) Appl. No.: 17/139,926

(22) Filed: Dec. 31, 2020

(65) Prior Publication Data

US 2021/0279202 A1 Sep. 9, 2021

Related U.S. Application Data (63) Continuation-in-part of application No. 16/919,091, filed on Jul. 1, 2020, now abandoned.

(60) Provisional application No. 62/869,970, filed on Jul. 2, 2019.

(51) Int. Cl.
 *G06F 16/00* (2019.01)
 *G06F 16/11* (2019.01)
 *G06N 20/00* (2019.01)
 *G06Q 30/0241* (2023.01)

(52) U.S. Cl.
 CPC ............. *G06F 16/11* (2019.01); *G06N 20/00* (2019.01); *G06Q 30/0247* (2013.01)

(58) Field of Classification Search
 CPC ..... G06F 16/11; G06N 20/00; G06Q 30/0247
 USPC .................................................. 707/600–899
 See application file for complete search history.

(56) References Cited

U.S. PATENT DOCUMENTS

| | | | |
|---|---|---|---|
| 11,094,014 B1* | 8/2021 | Gordon, III | G06Q 40/04 |
| 2010/0332312 A1* | 12/2010 | Klinger | G06Q 30/02 |
| | | | 707/812 |
| 2012/0232960 A1* | 9/2012 | Smith | G06Q 10/00 |
| | | | 705/7.35 |
| 2017/0011460 A1* | 1/2017 | Molinari | H04L 9/3247 |
| 2019/0304578 A1* | 10/2019 | Kain | G06F 16/2379 |
| 2019/0318348 A1* | 10/2019 | Brenner | G06Q 50/184 |

* cited by examiner

*Primary Examiner* — Michelle N Owyang (57) ABSTRACT

A computerized method useful for data ownership and management includes the step of providing a digital document. The method includes the step of providing a user to generate data. The method includes the step of aggregating the generated data based on a user instruction. The method includes the step of enabling a second party to enhance the generated data to generate a derivative dataset. The method includes the step of applying a set of rules with respect to the management of the user generated data. Applying the set of rules includes the step of applying a first rule that enables the user to own, control and manage said data. The method includes the step of applying a second rule that enables the user to own, control and manage said aggregated data. The method includes the step of applying a third rule that enables the user and other parties to have joint and fractional ownership of the aggregated data or the derivative asset. The method includes the step of applying rule a fourth rule that provides the distributed funds to parties with a partial ownership in aggregated data or the derivative data set.

7 Claims, 8 Drawing Sheets

DATA CONTROL, MANAGEMENT, AND PERPETUAL MONETIZATION CONTROL METHODS AND SYSTEMS

CLAIM OF PRIORITY

This application claims priority to U.S. patent application Ser. No. 16/919,091, filed on 1 Jul. 2020, and titled DATA CONTROL, MANAGEMENT, AND PERPETUAL MONETIZATION CONTROL METHODS AND SYSTEMS. This application is hereby incorporated by reference in its entirety.

U.S. patent application Ser. No. 16/919,091 claims priority to U.S. Provisional Patent Application No. 62/869,970, filed on 2 Jul. 2019, and titled DATA CONTROL, MANAGEMENT, AND PERPETUAL MONETIZATION CONTROL METHODS AND SYSTEMS. This provisional application is hereby incorporated by reference in its entirety.

BACKGROUND

Data can be categorized into two kinds. One that is generated, owned, and controlled by enterprises for commercial purposes and the other that can be linked to individuals (through the Personally Identified Information), referred to as PII for simplicity. One study estimates that there are 2.5 quintillion bytes of data created each day and that this rate is accelerating. For example, as users employ and interact with Internet of Things (IoT) devices even more data will be created and most of this growth can be associated with data that is enterprise owned and industrial in nature. There are three key problems surrounding data: Lineage and ownership of data (e.g. enterprise owned and PII); Handling and management of data around provenance, security, compliance, rights, privileges, and control of data; a framework for fractional monetization of data. Irrespective of who creates data, the current paradigm provides no ownership tracking of the data and if the data is PII based, the profit proceedings through monetization of such data is seldom shared with the entities associated with the PII. The sovereignty of data when monetized is another challenge. There is not an easy way for enterprises to ensure that third parties will not resell forward the data that has been sold to them. Accordingly, improvements to systems and methods of users' ability to own, profit and control their data are desired.

SUMMARY OF THE INVENTION

A computerized method useful for data ownership and management includes the step of providing a digital document. The method includes the step of providing a user to generate data. The method includes the step of aggregating the generated data based on a user instruction. The method includes the step of enabling a second party to enhance the generated data to generate a derivative dataset. The method includes the step of applying a set of rules with respect to the management of the user generated data. Applying the set of rules includes the step of applying a first rule that enables the user to own, control and manage said data. The method includes the step of applying a second rule that enables the user to own, control and manage said aggregated data. The method includes the step of applying a third rule that enables the user and other parties to have joint and fractional ownership of the aggregated data or the derivative asset. The method includes the step of applying rule a fourth rule that provides the distributed funds to parties with a partial ownership in aggregated data or the derivative data set.

BRIEF DESCRIPTION OF THE DRAWINGS

The present application can be best understood by reference to the following description taken in conjunction with the accompanying figures, in which like parts may be referred to by like numerals.

FIGS. 1 A-B schematically depicts a data ownership and management process, according to some embodiments.

The Figures described above are a representative set and are not an exhaustive with respect to embodying the invention.

DESCRIPTION

Disclosed are a system, method, and article of a data control, management, and perpetual monetization control. The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Blockchain is a continuously growing list of records, called blocks, which are linked and secured using cryptography. The blockchain is a digital ledger that allows parties to transact without the use of a central authority as a trusted intermediary. The ledger can group transaction together in blocks Each block typically contains a cryptographic hash of the previous block, a timestamp and transaction data. Various blockchain consensus algorithms can be utilized some of which are provided in this section. In this way, the blocks can be cryptographically chained together in a way that is tamper-proof and creates a mathematically indisputable history. The blockchain is a decentralized, distributed, and public digital ledger.

Proof-of-authority (PoA) is an algorithm used with blockchains that delivers comparatively fast transactions through a consensus mechanism based on identity as a stake. PoA uses identity as the sole verification of the authority to validate, meaning that there is no need to use mining. With PoA, the appointment of an authority is automatic, meaning that there can be no bias or uneven process caused by unequal stakes. In PoA, validators need to have their identity verified formally (e.g. via DApps) and have this identity information available in the public domain for everyone to cross-reference.

California Consumer Privacy Act (CCPA) is a bill that enhances privacy rights and consumer protection for residents of California, United States.

Delegated proof-of-stake (DPoS) works using witnesses, who generate blocks. Witnesses are elected by stakeholders at a rate of one vote per share per witness.

Dividend is a distribution of profits by an entity to its shareholders.

General Data Protection Regulation (GDPR) is a regulation in EU law on data protection and privacy for all individual citizens of the European Union (EU) and the European Economic Area (EEA).

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning.

Multisignature (Multi-sig) refers to requiring multiple keys to authorize a Bitcoin transaction, rather than a single signature from one key. Multi-sig can divide up responsibility for possession of bitcoins among multiple people. Avoiding a single-point of failure, making it substantially more difficult for the wallet to be compromised. M-of-N backup where loss of a single seed doesn't lead to loss of the wallet. Multi-sig is a safe deposit box with two keys.

Personally identifiable information (PII), as used in US privacy law and information security, is information that can be used on its own or with other information to identify, contact, or locate a single person, or to identify an individual in context.

Proof-of-work (PoW) consensus uses a mining mechanism. PoW can use a mining and computer power-based system in which participating users are required to solve difficult mathematical problems to validate and authenticate transactions. PoW works by verifying that work (mining) has been done before transactions are carried out.

Proof-of-stake (PoS) mechanism works using an algorithm that selects participants with the highest stakes as validators, assuming that the highest stakeholders are incentivized to ensure a transaction is processed. PoS can derives from actual holdings of the cryptocurrency.

Security is a tradable financial asset.

Underwriting services are provided by entities that guarantee payment in case of damage or financial loss and accept the financial risk for liability arising from such a guarantee.

Zero-knowledge proof is a method by which one party proves to another party that they know a specified value, without conveying any information apart from the fact that they know the specified value. The zero-knowledge proof can be used to prove such knowledge of the specified value without revealing the information of the specified value itself or any additional information.

Exemplary Processes

Figure 1A:
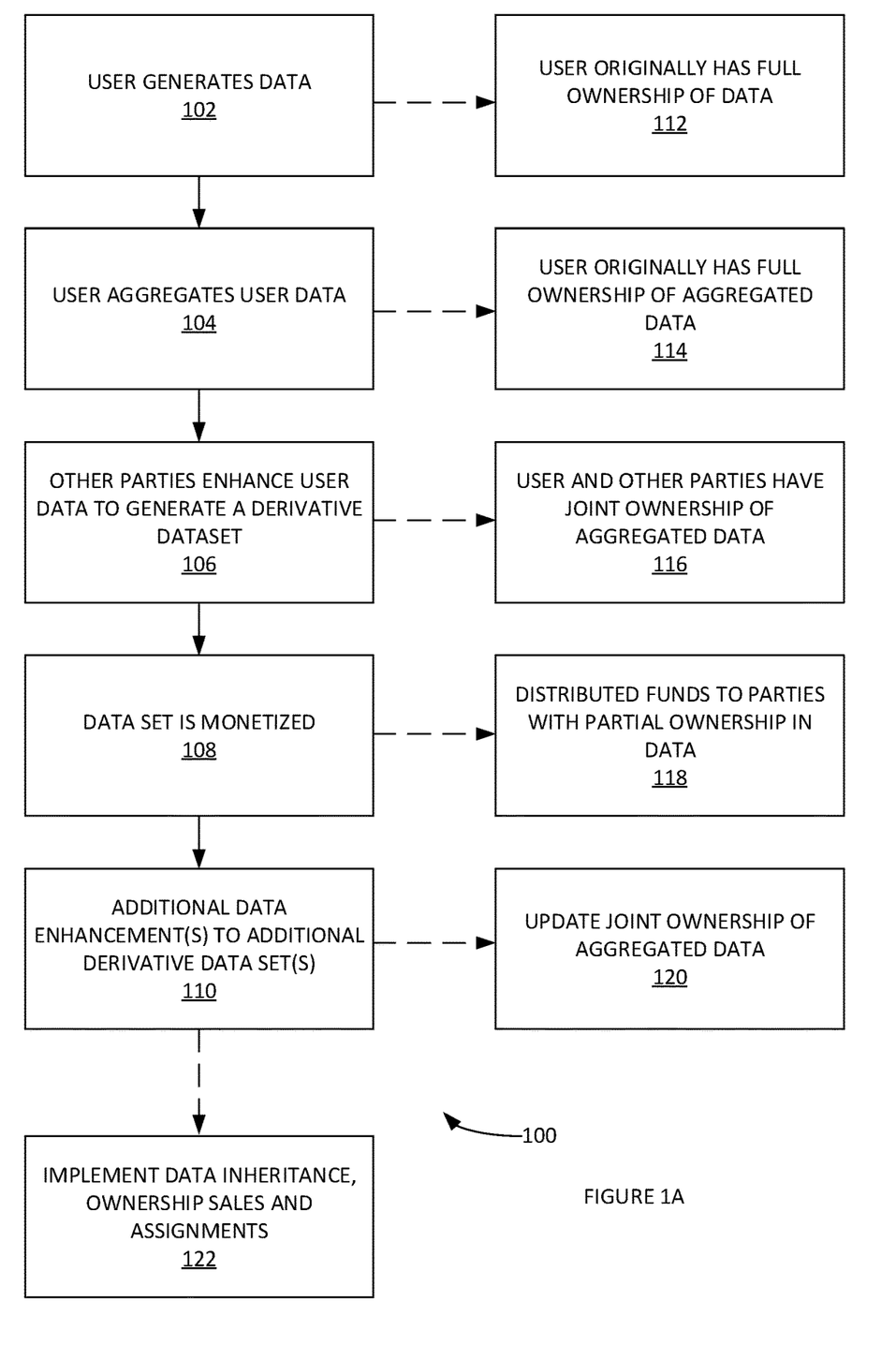
Figure 1B:
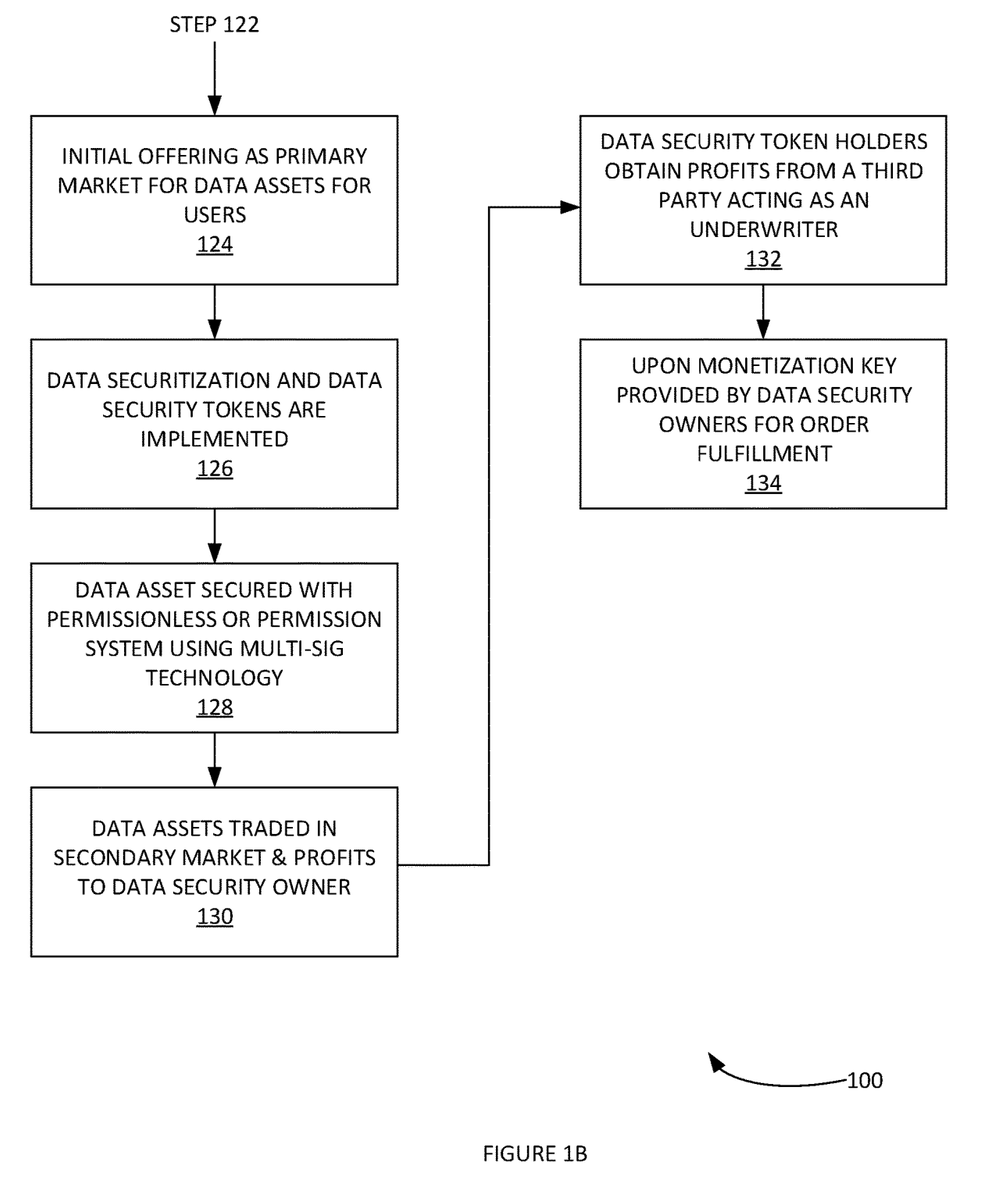

FIGS. 1 A-B schematically depicts a data ownership and management process, according to some embodiments. In FIG. 1A, process 100 includes steps 102-110 and associated rules 112-122. In step 102, process 100 can enable a user to generate data. Process 100 can apply rule 112 that enables the user to own, control and manage said data. This can be full ownership, control, and management rights. In step 104, the user can aggregate various user data. Process 100 can apply rule 114 that enables the user to own, control and manage said aggregated data.

In step 106, process can enable other parties enhance user data to generate a derivative dataset or a Machine Learning/Artificial Intelligence based model. Process 100 can apply rule 116 that enables the user and other parties have joint and fractional ownership of aggregated data or derived assets. In step 108, the dataset and/or derivative asset can be monetized. Process 100 can apply rule 118 that provided the distributed funds to parties with partial ownership in data.

These steps can continue and include additional downstream parties and/or various iterations of upstream parties adding/enhancing datasets. Accordingly, in the 108, additional data enhancement(s) to additional derivative data set(s). Process 100 can apply rule 120 and 122. In rule 120, update joint ownership of aggregated data. In rule 122, implement data inheritance, ownership sales and assignments with respect to the profits that would be generated from the data This is accomplished by underwriting and issuing securities on the data and derived assets (ML/AI) models that can be traded in the securities market. The holder of the securities is entitled to profit generated from the underlying data and ML/AI assets.

In FIG. 1B, process 100 continues to step 124, process 100 implements an initial offering as primary market for data assets for users. For example, process 100 can provide an initial data asset offering. In this example, a user can be individuals, companies, educational institutions, etc. Individuals can monetize data. The data can be linked via PII. Companies can monetize data generated by various systems (e.g. company computing systems, etc.) owned by said companies.

In step 126, process 100 implements data securitization and data security tokens are implemented. A data asset can have multiple owners. These can be tracked on a distinct ledger. Profits from the data asset can be given to the owner(s) of the security.

In step 128, the data asset secured with permissionless or permission system using multi-sig technology.

In step 130, the data assets can be traded in secondary market and profits from the trades can be provided to data security owner.

In step 132, data security token holders obtain profits from a third party acting as an underwriter.

In step 134, upon monetization, process 100, provides a key by data security owners for order fulfillment.

Figure 2:
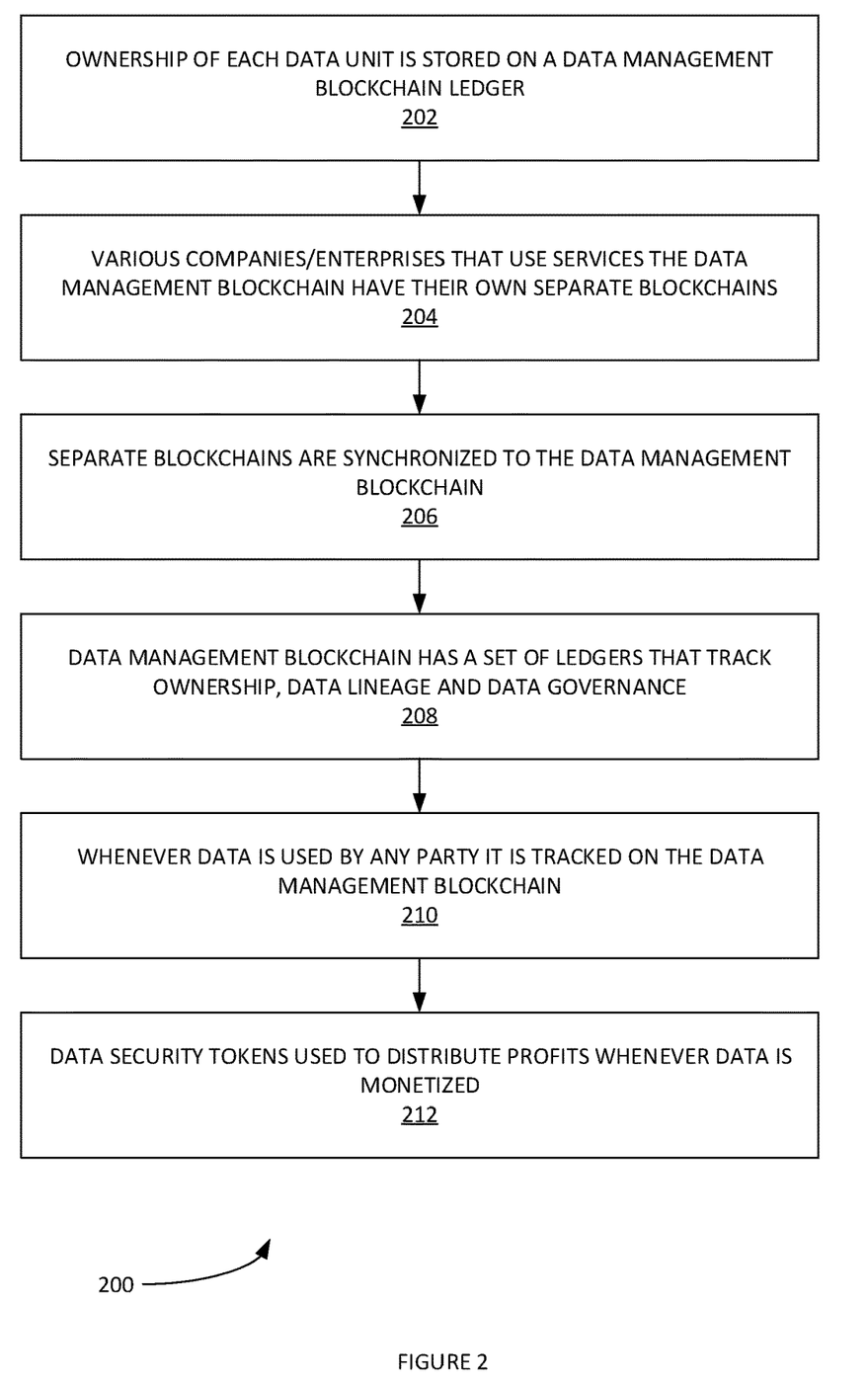
FIG. 2 illustrates an example process for management data ownership, data lineage and data governance on a blockchain system via a consortium of connected consortia framework, according to some embodiments.

FIG. 2 illustrates an example process 200 for management data ownership, data lineage and data governance on a blockchain system, according to some embodiments. In step 202, the ownership lineage of each data unit is stored on a data management blockchain ledger. In step 204, the various companies/enterprises that use services the data management blockchain have their own separate blockchains, or become consortiums. In step 206, the separate blockchains are synchronized to the data management blockchain for all connected consortia, making it a Consortium of Consortia Data Lineage Blockchain system. In step 208, the data management blockchain has a set of ledgers that track ownership, data lineage and data governance. Step 208 can implement asset tracking etc. In step 210, whenever data is used by any party it is tracked on the data management blockchain. In step 212, the data security tokens are used to distribute profits whenever data is monetized.

Process 200 can track each time data is used. Each block chain(s) is synchronized to management block chain ledger. The management block chain ledger to determine payments to the various relevant parties. Process 200 can also use the management block chain ledger to implement any relevant data consent mechanisms regarding the use the data. The management block chain ledger includes an auditing mechanism to audit data. The auditing mechanism ensures compliance with various controls and determines if/when breaches have occurred. The management block chain ledger includes provenance for each data item added to the block chain, as well as, the lineage (e.g. origin) of data. Process 200 can enable the investigation of breaches on individual data level. Process 200 can utilize zero knowledge proofs.

Figure 3:
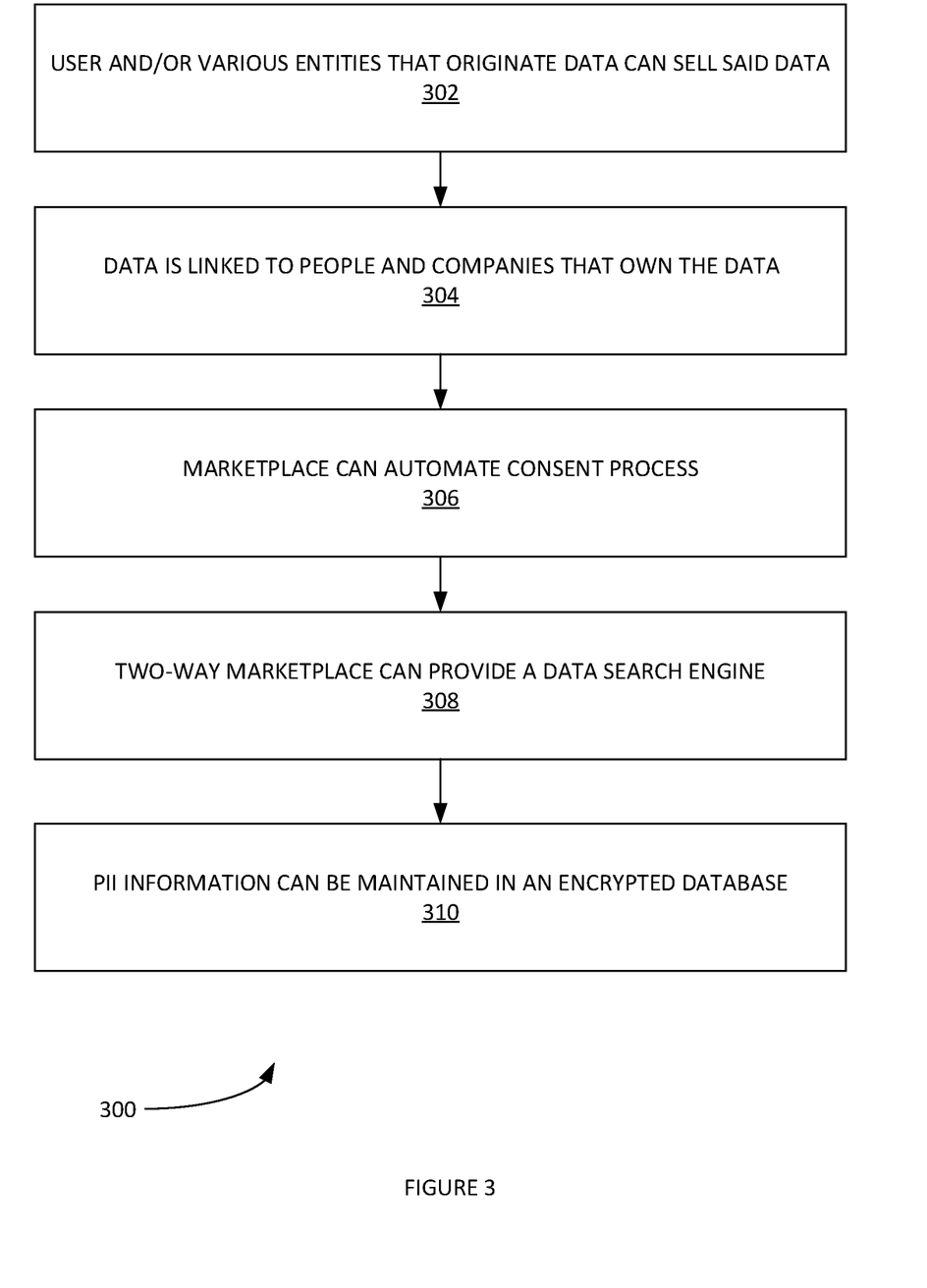
FIG. 3 illustrates an example process for implementing a two-way marketplace data marketplace, according to some embodiments.

FIG. 3 illustrates an example process 300 for implementing a two-way marketplace data marketplace, according to some embodiments. The two-way marketplace data marketplace can be available to both data sales and data purchasing. In step 302, a user and/or various entities that originate data can sell said data. The data can be functional and homogeneous data. In step 304, the data is linked to people/entities and companies that own the data. In step 306, the marketplace can automate consent process. For example, whoever buys data can search for data on basis of PII (see figure in Appendix). In step 308, the two-way marketplace can provide a data search engine. Data purchasing entities can search for specific demographic, medical history, purchasing history, education, life history, etc. In step 310, the PII information and/or other user data can be maintained in an encrypted database. User data is locked with a private encryption key controls data assets.

Figure 4:
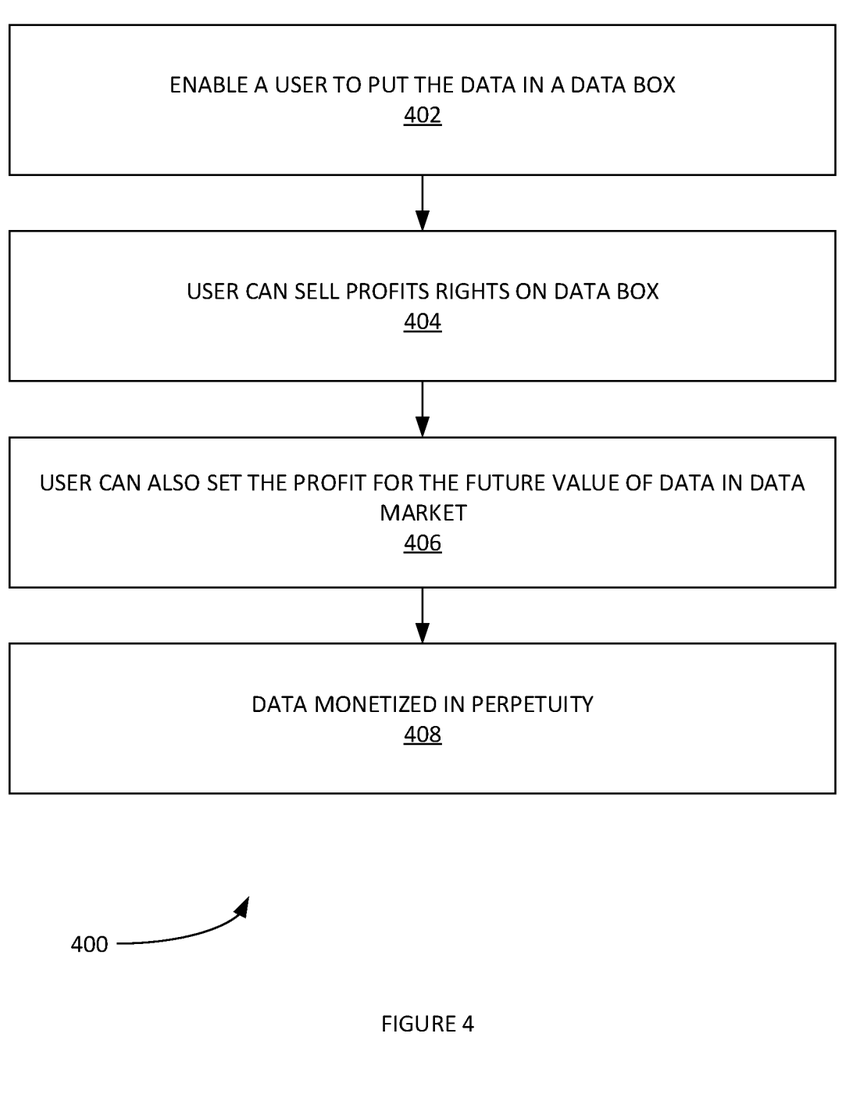
FIG. 4 illustrates an example process for implementing a data privacy box in a two-way data marketplace, according to some embodiments.

FIG. 4 illustrates an example process 400 for implementing a data privacy box in a two-way data marketplace, according to some embodiments. As noted supra, the user data is maintained in an encrypted database. Since data is locked, process 400 can enable users to provide private encryption key to the user's heirs without compromising the data privacy. In step 402, process 400 can enable a user to put the data in a data box. In step 404, the users can sell profits rights on data box. For example, the data box profit rights can be sold in a market in whole or in part.

In step 406, the user can also set the profit for the future value of data in data market. For example, another party can purchase the rights to profit from the user's data in the database and then monetize the data in the data box. In step 408, the data is monetized in Perpetuity. The data assets are monetized in perpetuity via trading in the data marketplace and data security tokens for future profits and dividends in data.

Figure 5:
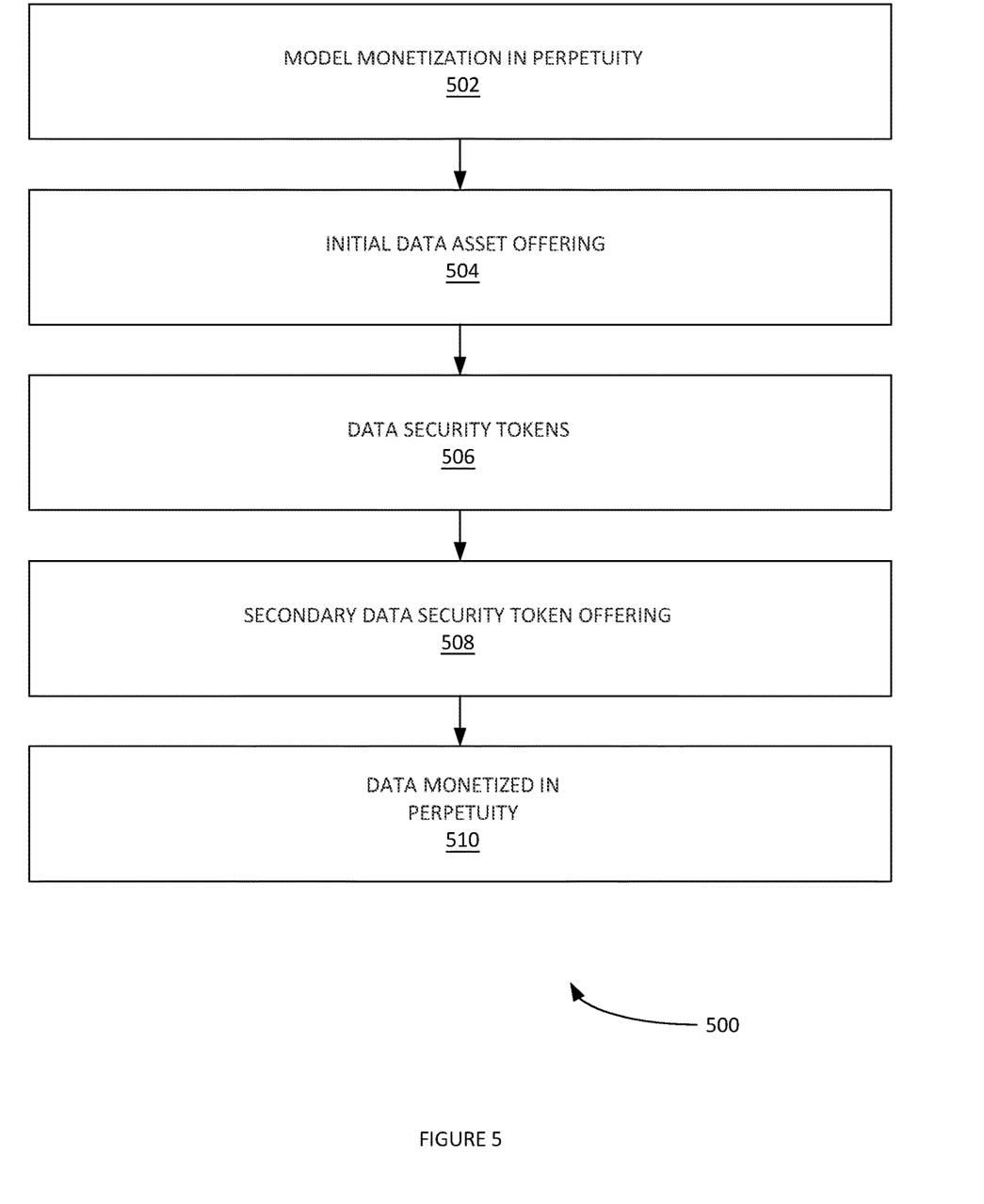
FIG. 5 illustrates another example process for data is monetization, according to some embodiments.

FIG. 5 illustrates another example process 500 for data is monetization, according to some embodiments. In step 502, model monetization in perpetuity is implemented. Various aspects of data monetization, including, inter alia: data marketplace, multi-party data ownership, data lineage, data provenance, data monetization in perpetuity, data asset creation, data securitization, data security token, etc. can be implemented/optimized with machine learning based models. Additional information regarding machine learning methods is provided infra. For example, machine learning based models and algorithms that involve multi-party model ownership can be utilized.

In one example, multiple people/researchers and/or companies pledge their data assets to generate machine learning models. In a framework for multi-party ownership, whenever the machine learning models are monetized, multiple people/researchers and/or companies pledge their data assets to generate machine learning model are remunerated based on their ownership stake in the model.

In step 504, process 500 can provide an initial data asset offering (e.g. see FIG. 1 supra). In this step, securities are issued on the data assets for distribution amongst the stakeholders for the said data asset. The holders of the securities are rewarded for all future profit proceedings from data asset as per the percentage ownership stake that they possess.

In step 506, Data security tokens are implemented. The primary offering of securities (e.g. as Data Security Tokens) for the data asset represents a mechanism whereby profit of any future monetizing of any data assets. the data asset is locked using encryption and once data is monetized in a data marketplace, the data security token holder releases encryption keys for data to be monetized. The mechanism can be automated via smart contracts.

In step 508, process 500 implements secondary data security token offering(s). The securitized data asset is traded in the secondary market. Holders of security tokens can receive profit proceedings once Data Asset is monetized (e.g. see FIG. 1 supra).

In step 510, data monetization can be implemented in perpetuity (e.g. see FIG. 4 supra).

Example Computing Systems

Figure 6:
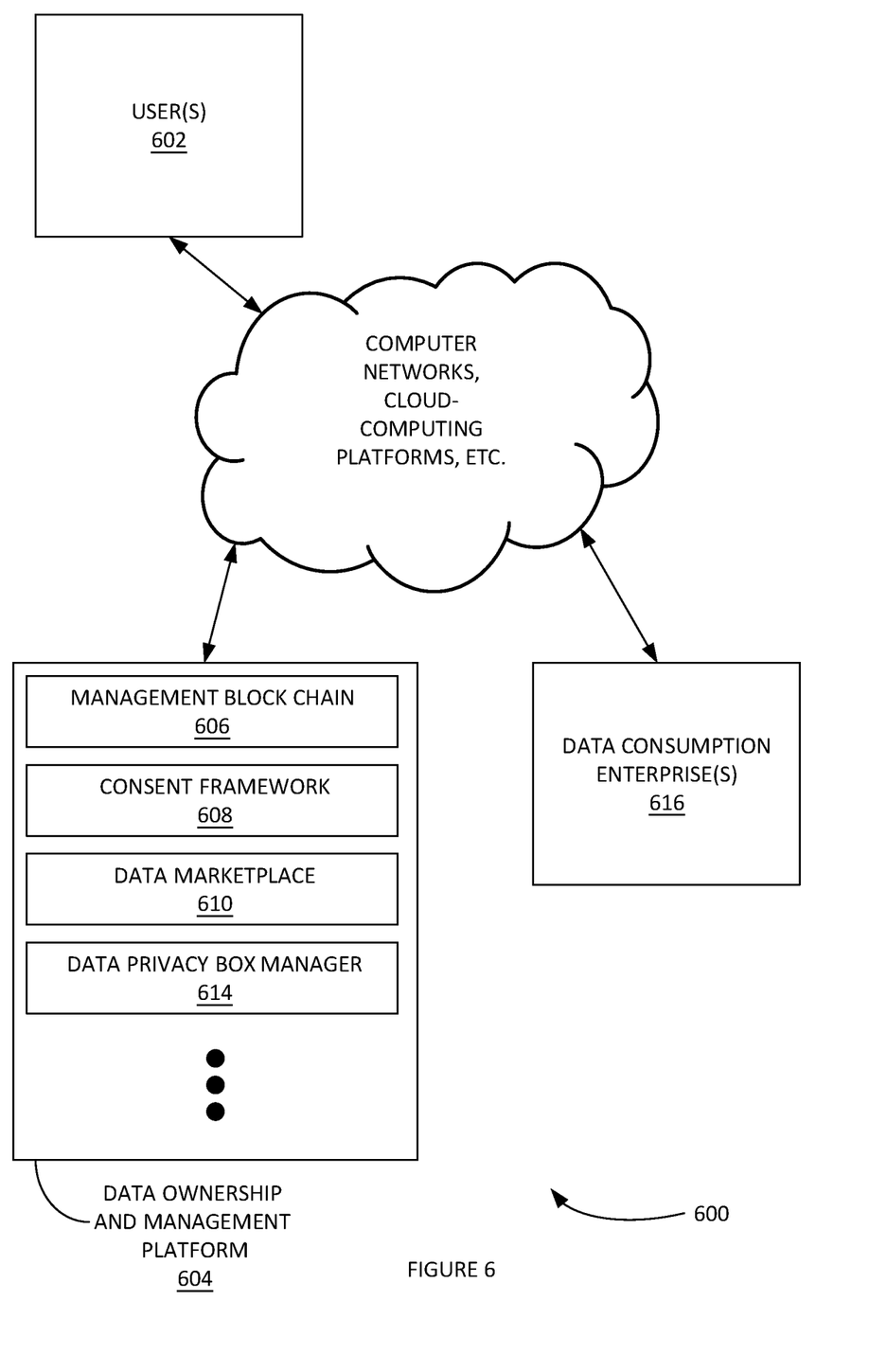
FIG. 6 illustrates an example system for implementing a data ownership and management, according to some embodiments.

FIG. 6 illustrates an example system 600 for implementing a data ownership and management, according to some embodiments. System 600 can be used to implement process 100-400 supra. User(s) 602 can generate data. User(s) 602 can use data ownership and management platform 604 to sell data and monetize future use of data. User(s) 602 can use data ownership and management platform 604 to set data privacy settings. User(s) 602 can use data ownership and management platform 604 to assign data rights and heirs to data monetization.

Data ownership and management platform 604 be used to manage various types of data. For example, one type of data is data owned by people (e.g. PII, etc.). Another type of data is data owned by companies. Data ownership and management platform 604 can be used to assign rights, privileges, controls and/or constraints around the data. Data ownership and management platform 604 can provide that ownership of the data is vested with the person/user that generates said data. Data ownership and management platform 604 can provide various tools to enforce rights around data ownership components (e.g. there can be partial/joint data ownership). A company (e.g. data consumption enterprise(s) 616) can obtain/purchase/lease raw data. Data consumption enterprise(s) 616 can adds value to the raw data then obtains partial ownership in data assets created through the collaboration through multiple parties. For example, data consumption enterprise(s) 616 can include various researcher/data analytics entities that use user raw datasets to create another dataset. This derivative data set can be more valuable the raw set. The derivative data set can have an ownership split between the user who generated the raw dataset and the researchers who developed the derivative data set. Original user can control/manage monetization and obtain a distributed based on ownership shares. Data ownership and management platform 604 can provide profit sharing rights and future profit-sharing rights.

Data ownership and management platform 604 can include a management blockchain 606. The management blockchain 606 can include a block chain ledger of all the data in system 600. The management block chain 606 can be synchronized in blockchains in Data consumption enterprise(s) 616 computing systems.

Data ownership and management platform 604 can include a consent framework 608. Consent framework 608 can incorporate various data privacy regulations (e.g. based on local governmental rules/laws, national rules/laws, etc.). Example governmental rules/laws are provided supra in the definition sections. Consent framework 608 can be tied to data privacy solution architecture (e.g. a data wallet, a data privacy box, etc.). Consent framework 608 can enable users to provide data use consent at various levels, uses, periods, parties with access, etc. Consent can be compliant with various federal, state, and international regulations and/or rules. A log of data uses can be stored in a decentralized location. Consent framework 608 can provide a government regulatory product that can be used to verify compliance.

In some embodiments, each enterprise can provide a consent framework with specified governmental regulations. Each time customer/user data is accessed, consent framework 608 can provide user interface that obtains the consent based on the relevant regulations. Consent framework 608 can also provide a dashboard that displays historical data use and lineage. In this way, the customers/users can access this information and verify valid and possible invalid uses.

Data marketplace 610 can provide the two-way marketplace data marketplace can be available to both data sales and data purchasing. Data marketplace 610 can include various functionalities such as, inter alia: web servers, databases, database management systems, e-commerce systems, etc. demo: (http://marketplace.datasaas.ai)—functional data (all types of data on entities, such as genomics, health records, mental health, IoT, etc., and entity matching using AI for users of multiple vendors so there data can be combined on the fly to make functional data Data privacy box manager 612 can implement data privacy boxes (e.g. such as those provided supra. Data privacy box manager 612 can provide encryption functionalities. Data privacy box manager 612 can enable other uses to inherit a monetization of another user's data privacy box.

Additional Example Computing Systems

Figure 7:
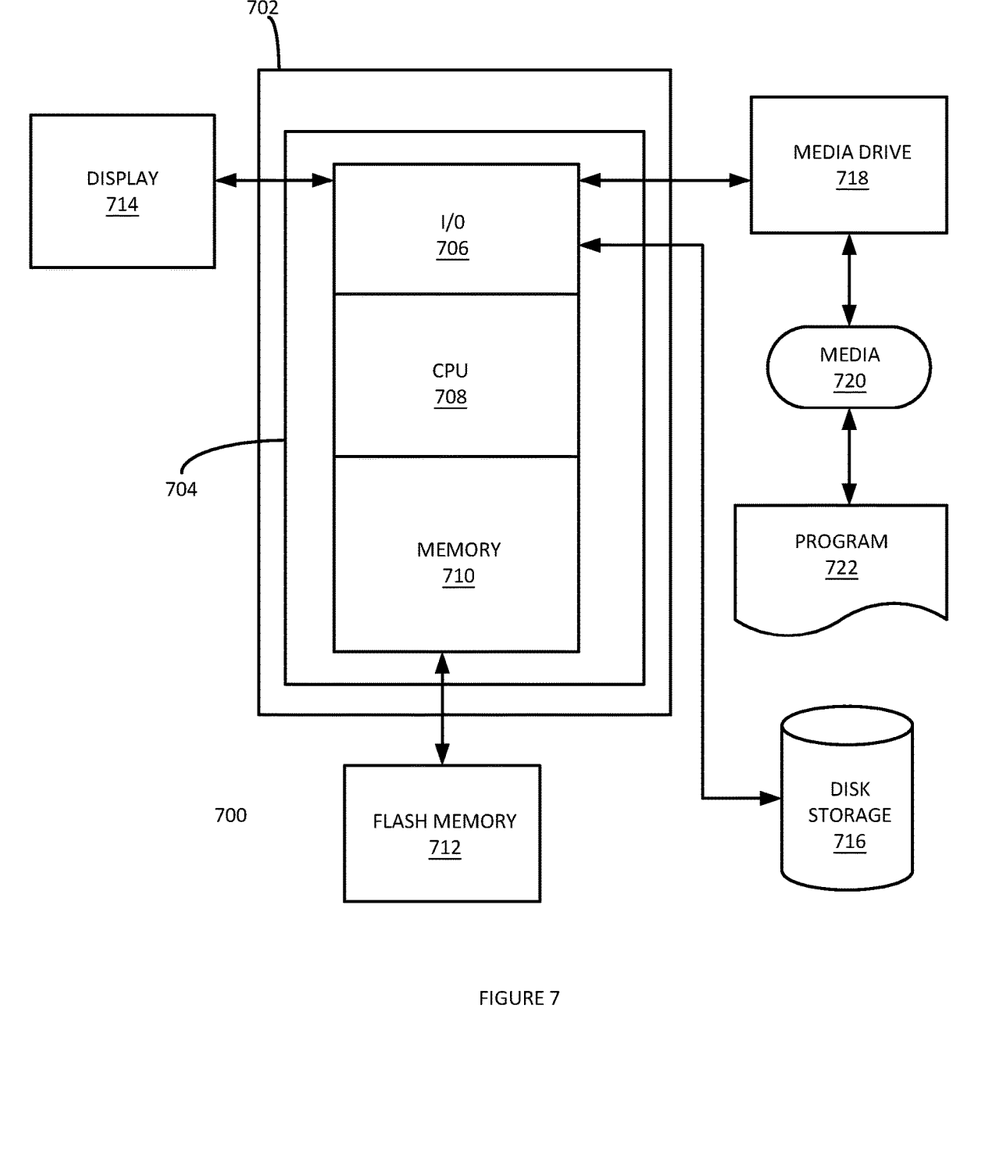
FIG. 7 is a block diagram of a sample computing environment that can be utilized to implement some embodiments.

FIG. 7 depicts an exemplary computing system 700 that can be configured to perform any one of the processes provided herein. In this context, computing system 700 may include, for example, a processor, memory, storage, and I/O devices (e.g., monitor, keyboard, disk drive, Internet connection, etc.). However, computing system 700 may include circuitry or other specialized hardware for carrying out some or all aspects of the processes. In some operational settings, computing system 700 may be configured as a system that includes one or more units, each of which is configured to carry out some aspects of the processes either in software, hardware, or some combination thereof.

FIG. 7 depicts computing system 700 with a number of components that may be used to perform any of the processes described herein. The main system 702 includes a motherboard 704 having an I/O section 706, one or more central processing units (CPU) 708, and a memory section 710, which may have a flash memory card 712 related to it. The I/O section 706 can be connected to a display 714, a keyboard and/or other user input (not shown), a disk storage unit 716, and a media drive unit 718. The media drive unit 718 can read/write a computer-readable medium 720, which can contain programs 722 and/or data. Computing system 700 can include a web browser. Moreover, it is noted that computing system 700 can be configured to include additional systems in order to fulfill various functionalities. In another example, computing system 700 can be configured as a mobile device and include such systems as may be typically included in a mobile device such as GPS systems, gyroscope, accelerometers, cameras, etc.

Example Machine Learning Processes

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning. Random forests (RF) (e.g. random decision forests) are an ensemble learning method for classification, regression, and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Machine learning can be used to study and construct algorithms that can learn from and make predictions on data. These algorithms can work by making data-driven predictions or decisions, through building a mathematical model from input data. The data used to build the final model usually comes from multiple datasets. In particular, three data sets are commonly used in different stages of the creation of the model. The model is initially fit on a training dataset, that is a set of examples used to fit the parameters (e.g. weights of connections between neurons in artificial neural networks) of the model. The model (e.g. a neural net or a naive Bayes classifier) is trained on the training dataset using a supervised learning method (e.g. gradient descent or stochastic gradient descent). In practice, the training dataset often consist of pairs of an input vector (or scalar) and the corresponding output vector (or scalar), which is commonly denoted as the target (or label). The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). Validation datasets can be used for regularization by early stopping: stop training when the error on the validation dataset increases, as this is a sign of overfitting to the training dataset. This procedure is complicated in practice by the fact that the validation dataset's error may fluctuate during training, producing multiple local minima. This complication has led to the creation of many ad-hoc rules for deciding when overfitting has truly begun. Finally, the test dataset is a dataset used to provide an unbiased evaluation of a final model fit on the training dataset. If the data in the test dataset has never been used in training (e.g. in cross-validation), the test dataset is also called a holdout dataset.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computerized method useful for data ownership and management, comprising:
   providing a digital document;
   providing a user to generate data;
   aggregating the generated data based on a user instruction;
   enabling a second party to enhance the generated data to generate a derivative dataset;
   applying a set of rules with respect to a management of a user generated data, wherein the set of rules comprises:
   applying a first rule that enables the user to own, control and manage a data,
   applying a second rule that enables the user to own, control and manage an aggregated data,
   applying a third rule that enables the user and other parties to have joint and fractional ownership of the aggregated data or the derivative asset, and
   applying a fourth rule that provides a distributed fund to parties with a partial ownership in the aggregated data or the derivative data set;
   implementing an initial offering as a primary market for the generated data, the aggregated data, and the derivative data set
   implementing a data securitization and generating a set of data security tokens, wherein each data asset has multiple owners that are tracked on a distinct ledger, and wherein any profits from the generated data, the aggregated data and, the derivative data set are provided to an owner of a security generated by the data securitization, wherein the generated data, the aggregated data and, the derivative data set is secured with permissionless or permission system using a multi-signature technology,
   wherein a data security token holder releases an encryption key for the data, and wherein the release of the encryption key is automated via a smart contract,
   wherein when a machine learning (ML) model uses the aggregated data or the derivative data set a holder of an associated security is entitled to a portion of the profit generated from the aggregated or the derivate data set,
   wherein the derivative data set comprises a training data set for a machine-learning based model,
   wherein the generated data, the aggregated data and the derivative data set is traded in a secondary market and profits from a trade of the generated data, the aggregated data and the derivative data set are provided to data security owner, and
   wherein a data security token holder obtains a profit from a third party acting as an underwriter.

2. The computerized method of claim 1 further comprising:
   monetizing the generated data or the derivative dataset.

3. The computerized method of claim 2 further comprising:
   applying a fifth rule to update the joint ownership of aggregated data.

4. The computerized method of claim 2 further comprising:
   applying a sixth rule to implement a data inheritance plan.

5. The computerized method of claim 4 wherein the data inheritance plan comprises a set of ownership, sale, and assignment instructions with respect to a profits that are generated from the data.

6. The computerized method of claim 5, wherein the profits are generated by an underwriting process and an issuing securities on the aggregated data or the derivative data set.

7. The computerized method of claim 6, wherein, upon a monetization event, a key by a data security owner is provided for an order fulfillment.

* * * * *